United States Patent Office 2,957,753
Patented Oct. 25, 1960

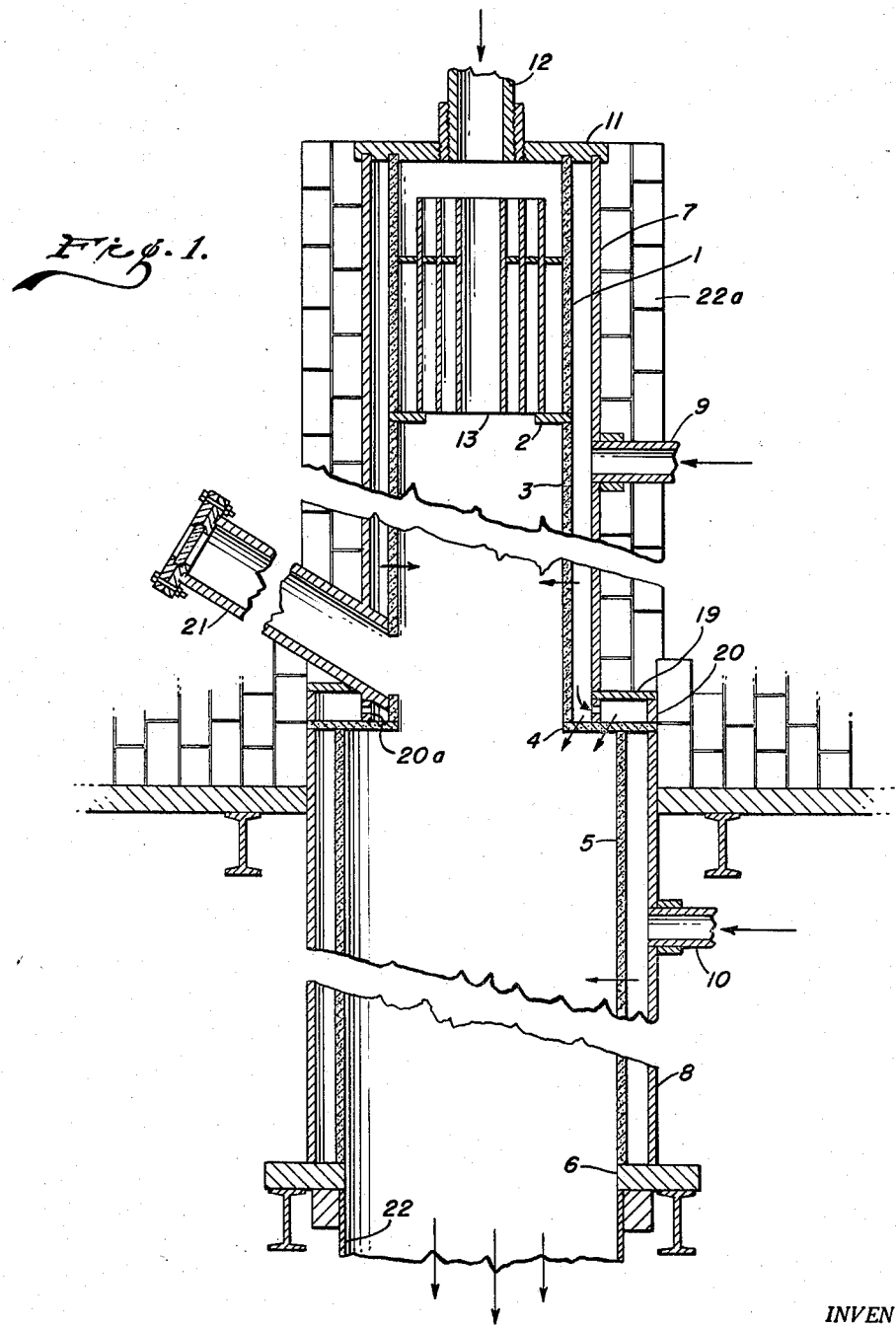

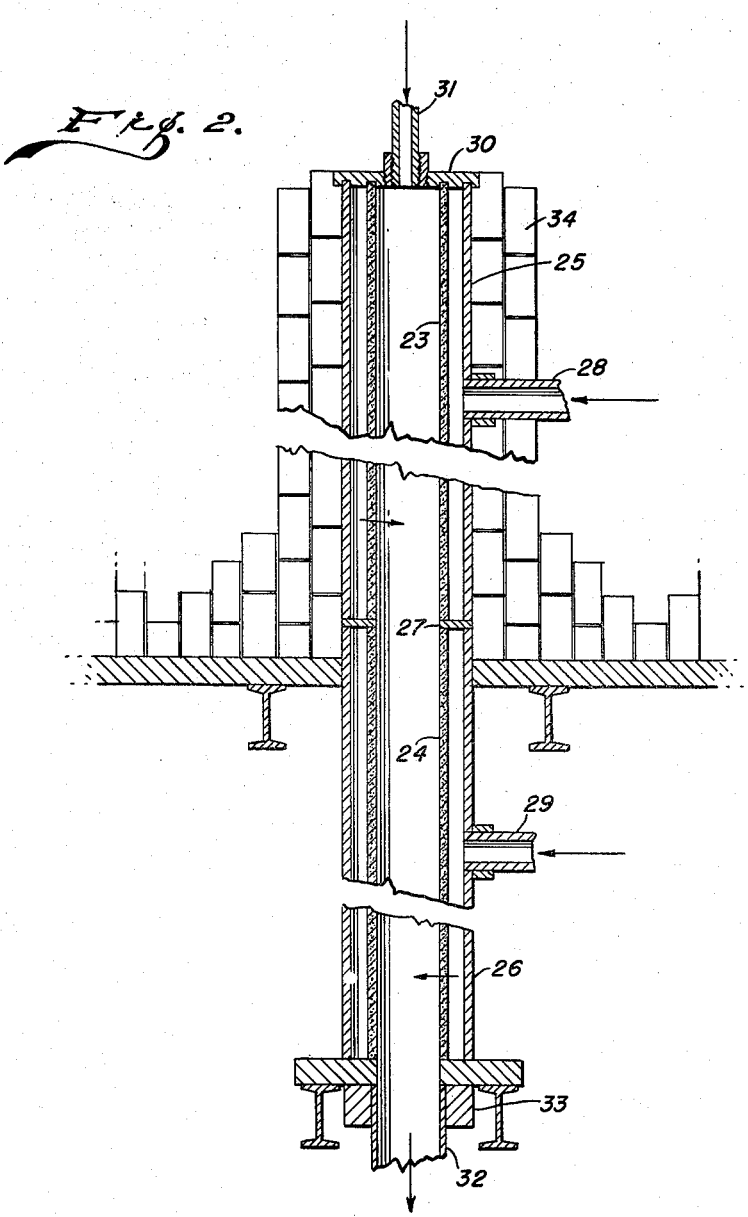

2,957,753
TITANIUM DIOXIDE FROM TITANIUM TETRACHLORIDE

Earl W. Nelson and James E. Bondurant, Lynchburg, Va., and Guy C. Marcot, Bound Brook, N.J., assignors to American Cyanamid Company, New York, N.Y., a corporation of Maine Filed Nov. 5, 1958, Ser. No. 772,651

16 Claims. (Cl. 23—202)

The present invention relates to the manufacture of titanium dioxide pigment by combustion of a unitary stream of titanium tetrachloride and oxygen. The invention more particularly relates to the manufacture of titanium dioxide pigment (both of the anatase and rutile crystal forms) by combustion in full displacement flow of a preformed homogeneous gaseous mixture comprising titanium tetrachloride and oxygen as principal pigment-producing components. The invention includes combustion of the gas in streamline or turbulent flow, and apparatus therefor.

Up to the present, the manufacture of titanium dioxide by combustion of titanium tetrachloride with oxygen has generally been accomplished by strongly preheating at least one of the gases so as to ensure the high flame temperature generally believed necessary for the production of good quality pigment and separately admitting the gases to a combustion chamber where they burn. In other instances it has been found preferable to supply the necessary heat by combustion of a separately admitted fuel gas.

Such methods for the manufacture of titanium dioxide have the following principal disadvantages.

(1) The oxygen, before combustion, picks up contaminants from the piping in which it is conveyed, which contaminants must be removed for best results; cf. U.S. Patent No. 2,541,495.

(2) The separate admission of titanium tetrachloride and oxygen into a combustion chamber with or without fuel gas has generally required a gas feed orifice or burner of complex design; cf. U.S. Patents Nos. 2,394,633, 2,635,946 and 2,653,078.

(3) During combustion, tight scaly deposits of titanium dioxide rapidly accumulate in the chamber, including the burner nozzles. This scale must be removed from time to time and thus prevents continuous operation; cf. U.S. Patents Nos. 2,619,434 and 2,653,078.

(4) The production of good quality pigment has required that a nucleating agent such as hydrogen, a hydrocarbon, water vapor or an oxide of nitrogen be added to the feed gas; cf. U.S. Patents Nos. 2,488,439, 2,488,-440 and 2,502,347. This introduces an additional metering problem and causes loss of chlorine by its conversion into hydrochloric acid.

From the foregoing it will be seen that the present-day commercial production of titanium dioxide pigment of high quality and uniformity is a complex operation requiring careful control and specialized equipment.

We have now discovered that titanium dioxide pigment can be produced while avoiding these disadvantages by a distinctively different process which in preferred embodiments contains the following principal features.

(1) The pigment is formed by burning a unitary homogeneous gaseous combustion mixture. This eliminates need for a burner of complex design and delivery of separate streams of gas at various temperatures.

(2) The combustion mixture is burned while passing through a reactor in full displacement flow. The gas thus burns at a distance from the feed orifice; hence plugging is avoided without need for inert shielding gas.

(3) The combustion gas is supplied to the reactor at a low temperature compared to that hitherto employed and excellent results have been obtained when the temperature of the gas on admission to the reactor has been as low as 250° C. This permits the gas to be prepared in aluminum apparatus and transmitted in aluminum piping, thus avoiding the contamination described in U.S. Patent No. 2,541,475.

(4) The gas may consist of titanium tetrachloride and oxygen alone. Since the reagents in such event are present in substantially stoichiometric equivalence the weight of titanium dioxide formed based on the weight of the feed gas is at substantially its theoretical maximum of 36%.

Other constituents (principally fuel components and diluents) may be present. When the gaseous compositions are burned according to the present invention small amounts of these non-pigment forming constituents yield greatest benefit. In practice the maximum amount present is such that the weight of titanium dioxide formed is about 24% of the weight of the gaseous mixture. This is 24÷36 or 67% of the theoretical maximum.

(5) No separately added nucleating agents are required, and this is an additional feature of the invention. Our laboratory experiments have shown that when a mixture of titanium tetrachloride and oxygen in about 1:1 molar ratio is rapidly heated, the mixture passes through a phase in which a very minor amount of the titanium tetrachloride and oxygen directly interacts to form titanium oxide particles of sub-pigmentary size and that these particles can and do act as nuclei upon which the remainder of the titanium tetrachloride oxidizes when the mixture arrives at combustion temperature, making the addition of conventional nucleating agents unnecessary. The amount of titanium tetrachloride thus converted into nuclei is less (and usually much less) than 0.1% of the weight of titanium tetrachloride in the mixture and often amounts to little more than a trace.

We have found that the rate of nuclei formation becomes appreciable at about 700° C. or higher. Formation of these nuclei, we have also found, is a reaction which is not accompanied by emission of visible light in detectable amount.

(6) The feed gas is admitted to the reactor at a temperature below its nucleation point and thus does not start to burn until it has advanced some distance from the feed orifice. As a result, formation of titanium dioxide deposits on the orifice is prevented, and an inert shielding gas becomes unnecessary.

(7) The combustion may and preferably does take place in a reactor having walls of porous refractory. Passage of gas transversely through the walls into the reactor, we have found, completely prevents formation of adherent titanium dioxide deposits anywhere thereon. The apparatus may thus be operated on a continuous basis.

From the foregoing it will be seen that the present invention is principally based upon the concept of continuously passing a comparatively cool homogeneous combustion mixture of the type described at or below its nucleation temperature into a substantially self-sustaining flame formed by combustion of the gas itself, the flame having a temperature in the pigment-forming range of about 900°–1600° C. It was conceived that if the gas could be caused to pass into the flame in full displacement flow, the gas would be uniformly heated by radiation, sub-pigmentary titanium oxide nuclei would be uniformly developed therein in large number, and an output of quite uniformly sized particles within the pigmentary range would consequently be achieved.

The invention is further based on two additional concepts. The first is supplying the combustion gas mixture to the reactor at a sufficiently low temperature, at or below its nucleation temperature, to prevent formation of adherent titanium dioxide deposits on the initial portion of the reactor (including the gas feed orifice). The second is preventing formation of deposits on the remainder of the reactor by forming the wall of the reactor of porous refractory and passing a part of the reaction gases or an inert gas through the wall at a rate sufficient to prevent formation of deposits thereon.

By "full displacement flow" is meant a flow in which each increment of admitted gas forces along or displaces the previously admitted increment and is essentially the same as the flow of water through a pipe. Full displacement flow is entirely different from diffuse flow which occurs in the case of flow of gas into and through a large chamber, or water into and through a tank, wherein each increment of gas or water has substantially different residence time. According to the present invention the combustion mixture has an average speed between about ⅔ and ⅘ of its axial speed (i.e., its speed in the center of the conduit).

Full displacement flow may be streamline or turbulent. Gas in full displacement turbulent flow contains numerous eddies, which may be detected by the use of smoke. The eddies occurring in this type of flow are negligibly small, and for that reason and because of the speed ratio range mentioned, residence time of the combustion mixture in the flame zone is substantially uniform. With laminar combustion, full displacement flow coupled with the speed ratio range mentioned causes the flame to be essentially flat, so that each portion of the gas as it advances receives substantially the same amount of heat by radiation from the flame and, when it burns, passes through substantially the same temperature gradient at substantially the same rate as every other portion.

We prefer the average speed of the combustion gas at the flame front to be between about ¾ and ⅝ of its axial speed, this provided for particularly homogeneous combustion in the case of turbulent flow and a practically flat flame in the case of laminar flow. These principles apply whether the combustion mixture is supplied to the combustion zone as one single stream or as a number of separate smaller streams, e.g., as from a sprinkler head.

Laminar flames result from passage of gas in streamline flow into a flame front and are usually not more than about 1" long. Turbulent flames result from combustion of a gas in turbulent flow and are usually at least 4" long but may be a foot or more in length. The two types of flow and the resulting flames are discussed at length and are distinguished in the book "Combustion Flames and Explosions," by B. Lewis et al. (New York, N.Y., copyright 1951).

Apparatus suitable for the practice of the present invention is shown in the drawings, in which:

Fig. 1 is a section of a reactor suitable for the continuous manufacture of anatase and rutile pigment from a unitary combustion gas in streamline flow; and Fig. 2 is a section of a reactor for the continuous manufacture of rutile pigment from a unitary combustion gas in turbulent flow.

The reactors shown may be operated horizontally, but preferably are operated vertically.

The reactor of Fig. 1 is principally composed of an upper precombustion porous or gas permeable tube divided into upper flow stabilizing section 1 resting on perforated disc 2, lower nucleating section 3 resting on perforated porous disc 4, and lower porous cooling tube 5 resting on perforated non-porous disc 6. Porous tubing sections 1 and 3 are jacketed with non-porous tubing 7 and porous tubing section 5 is jacketed with non-porous tubing 8. Jackets 7 and 8 are provided with pipes 9 and 10 through which a purge gas or liquid may be supplied under low pressure and passed through the inner porous tubing thereby preventing adhesion of pigment particles thereto during operation of the apparatus. The upper end of the reactor is closed by removable channeled aluminum disc 11 provided with removable axially located aluminum combustion gas supply tube 12. Turbulence suppressor 13 (formed by nesting three aluminum tubes of decreasing diameter) rests on disc 2 in the upper part of the reactor. Screens 13–a–d (of 40-mesh screening) positioned across tube 4 near the exit end thereof assist turbulence suppressor 13 in imparting a desirable flat transverse velocity profile to the gaseous stream. Non-porous disc 19, non-porous ring 20 and non-porous perforated ring 20–a permit the inner lower surface of perforated disc 4 to be flushed with gas. Sightport 21 extends through the lower part of tube 3 permitting the flame front to be viewed when (as is usually the case) the flame is maintained at the junction of the large and small tubes. The apparatus discharges into removable tube 22 which may be provided with a conventional water-jacket (not shown) and led to apparatus adapted to separate titanium dioxide pigment from chlorine gas such as cyclone separator and Cottrell precipitator. This apparatus is conventional and is therefore likewise not shown.

Jacket 7 and upper part of jacket 8 are packed to a depth of about two feet in insulating brick 22–a.

The apparatus described may be constructed as follows. Standard Alundum shapes having a wall thickness of about ¼" to ½" may be used. The porous refractory may be porous Alundum having the porosity indicated by an apparent specific gravity of about 2.3. The diameter of tubes 1 and 3 may be 3" and their combined length 28". The diameter of upper jacket 7 may be 4" and the length of turbulence suppressor 13 may be 18". The diameter of combustion gas supply tube 12 may be 1.5". The diameter of cooling tube 5 may be 5"; its length should preferably be such that the temperature of the gaseous stream entering tube 22 is less than the temperature at which the titanium dioxide particles are plastic or adhesive.

For anatase production the insulation around lower jacket 8 may be quite thin or may even be omitted entirely so as to favor dissipation of heat by radiation and thus promote rapid cooling of the pigment. Formation of rutile is favored by insulation around at least the upper part of this zone so as to extend the time the pigment is maintained at temperatures where conversion of anatase to rutile takes place.

The amount of purge gas or liquid passed into the apparatus through pipe 9 need be no more than that necessary to prevent formation of titanium dioxide incrustations on tube 3. When gas is employed between about 0.1 and 2.0 cu. ft. (N.T.P.) per minute per sq. ft. of porous refractory surface has usually been sufficient, and pressures above about 1 lb./in.$^2$ gauge have not been required. As gases for this purpose there may be used an inert gas such as nitrogen, carbon dioxide, chlorine or any of the noble gases. The invention includes the addition to inert purge gas of small amounts of gases such as ammonia, a nitrogen oxide, water vapor and gases forming water vapor represented by ethyl acetate, butane, butanol, diethyl ether, diethyl ketone. These gases act as nucleating agents and may be added if desired to supplement the nuclei autogenously developed as described in the main feed gas.

In practice we prefer to employ carbon monoxide as the purge gas for this initial or upper zone as this gas possesses two important advantages. First it reacts with any free oxygen adjacent to the surface of tube 3, thus tending to suppress formation of titanium dioxide on the tube surfaces. Then (in the presence of chlorine), it tends to regenerate titanium tetrachloride from any titanium dioxide which may have formed on the walls and thus exerts a continuous chemical purging action. The temperature of the purge gas should be sufficient to maintain the combustion gas at a suitable temperature. Thus the temperature of the combustion gas or liquid controlled so as to maintain the temperature of the feed gas below its combustion point at least until the gas has passed through turbulence suppressor 13.

The purge gas or liquid admitted through lower pipe 10 performs the two primary functions of rapidly cooling the combustion products and preventing adhesion of titanium dioxide particles on the wall of pipe 5, particularly in the combustion area near the top of tube 5. Liquid or gaseous titanium tetrachloride or chlorine are most convenient, but carbon monoxide, carbon dioxide and the noble gases are also suitable. Liquid titanium tetrachloride at about room temperature is preferred for the reasons that its use does not give rise to a new gas separation problem and in practice it has furnished entirely adequate cooling.

The apparatus of Fig. 2 comprises upper porous combustion tube 23 and lower porous cooling tube 24 respectively jacketed by non-porous tubes 25 and 26 and separated by non-porous washer 27. Jackets 25 and 26 are perforated to admit supply pipes 28 and 29 which correspond to pipes 9 and 10 of Fig. 1.

The upper end of the apparatus is closed by channeled aluminum disc 30 provided with removable combustion gas supply tube 31. The apparatus discharges into removable aluminum pipe 32 which engages collar 33 with a friction fit. Jacket 25 and the upper part of jacket 26 is encased in insulating brick 33 to a depth of about two feet. Discharge tube 32 feeds to a conventional product separation system such as is discussed in connection with Fig. 1.

The apparatus of Fig. 2 may be constructed from Alundum of the types employed for the apparatus of Fig. 1. The inside diameter of tubes 23 and 24 may be 1.5". The length of tube 23 should be such that substantially all the combustion takes place within it. The length of tube 24 should be such that the pigment particles discharged have a temperature below the point at which they are tacky or adhesive. The diameter of gas feed pipe 31 may be $3/16"$ whereby good jet effect is provided.

The form of apparatus set forth above and its dimensions and materials of construction are not principal features of the invention and are set forth for illustrative purposes only.

The reactor of Fig. 1 may be placed in operation as follows:

The reactor is brought to normal operating temperature by burning carbon monoxide and oxygen (separately admitted by pipes passing through sight port 21) while passing air at 300° C. through pipe 12 to prevent turbulence suppressor 13 (if constructed of aluminum) from melting. At the same time flow of carbon monoxide through pipe 9 and liquid titanium tetrachloride into pipe 10 is begun.

When the central part of the tube has reached a temperature of about 1000° C., the carbon monoxide and oxygen supply pipes are removed and the flow of gas through pipe 12 is switched to a suitable combustion gas mixture having a temperature of about 250°–350° C. The gas spontaneously ignites in the hot zone. Its velocity should be such that the gas flows quietly through turbulence suppressor 13 and burns substantially in streamline flow as a laminar flame at or near to the exit end of tube 3.

As it advances into the nucleation zone the gas is rapidly heated to nucleation temperature by heat radiated from the flame just ahead, from the pigmentary particles formed in the flame, and from the surrounding walls of the apparatus.

The number of nuclei formed is most easily changed by varying the temperature at which the gas is admitted to the apparatus. The number of nuclei can also be changed by varying the thermal insulation around the apparatus upstream from the flame front and the speed at which the gas is admitted. The principal object is to cause the feed gas to move without premature combustion in steady streamline flow first into a nucleating zone, then into a streamline flame, and finally into a cooling zone, with recovery of particles of pigmentary dimensions therefrom.

The average particle size of the pigment produced appears to be an inverse function of the number of nuclei present, and this in turn appears to be related to the amount of heat supplied. Thus increasing the amount of heat (as by increasing the amount of fuel gas component in the gas feed) increases the number of nuclei and thereby decreases the average diameter of the pigment particles. Contrariwise, decreasing the temperature of the flame (as by decreasing the amount of fuel gas or by removing thermal insulation from the combustion zone) generally tends to decrease the number of nuclei and thus increase the diameter of the pigment particles formed. In this connection, however, our experiments have indicated that most copious formation of nuclei occurs in the vicinity of a range of 700° C.–800° C. as determined by thermocouple placed within the gaseous mixture (particularly at about 750° C.), there being decreased formation of nuclei on either side of this temperature or range. Allowance for this peak should be made when controlling particle size by varying combustion temperature.

The extent of nucleation is also affected by the speed at which the gases are admitted, a higher gas speed usually resulting in the formation of fewer nuclei.

Because of their brief life no method has been found for making a direct count of these nuclei, but an optimum number is usually present when the average diameter of the titanium dioxide particles formed is in the range of about $0.1\mu$ to about $0.4\mu$ as determined by electromicrophotograph. Pigment in this range is usually produced when the temperature and speed of the feed gas are correlated with heat-supplying or heat-conserving elements so that the temperature of the reactor about 4" upstream from the flame is about 700°–800° C.

The precise point at which the flame burns in the combustion zone is usually of minor importance, but we have found it preferable to provide the reactor with a flame holder of any conventional type which gives a steadier flame and thus results in pigment of increased uniformity. In Fig. 1 the junction of tube 3 with tube 5 constitutes one such type of flame holder. The flame can be readily brought to rest at the exit end of tube 3 by making appropriate adjustments in the rate of gas supply. Very good pigment, however, has been formed when combustion has taken place in the absence of a flame holder, for example, by adjusting the gas flow so that combustion takes place within tubes 3 or 5. Good pigment (both of the anatase and rutile modifications) has been obtained when the temperature of the flame, as found by optical pyrometer, has been between 1300° and 1500° C. This indicates that the precise location and temperature of the flame are not principal features of the invention.

The presence of a laminar as distinguished from a turbulent flame is most conveniently determined by inserting a sighting probe up the discharge end of the apparatus into the flame and moving the end of the probe in and out of the flame thus measuring the depth or thickness of the flame. The depth of a laminar flame is less than 1" and is usually only a fraction of an inch, whereas turbulent flames are usually at least 3" deep and not infrequently have a depth a foot or more in apparatus of the type described.

The combustion products are cooled until the titanium dioxide particles suspended therein are non-tacky, preferably to 800°–1000° C. or less by cold gases or liquids admitted through pipe 10. The titanium dioxide is then separated from the residual gas in any convenient manner as for example a cyclone separator followed by a Cottrell precipitator. The residual gas is largely chlorine which can be employed as raw material for the manufacture of more titanium tetrachloride from ilmenite or titaniferous slag, thus making the process cyclic.

The pigment recovered is suitable for use as an opacifier in the manufacture of paper. For general use, including use in the manufacture of paints and varnishes the pigment is advantageously calcined at 500° C. for 30 minutes to expel adsorbed chlorine and is then milled in a fluid energy mill to decrease its oil absorption.

The apparatus of Fig. 2 may be prepared for use by preheating pipe 23 to about 1200° C. while maintaining aluminum head 30 at a temperature below about 500° C. by admission of cold gas. Preheating is then discontinued.

Pigment may be produced by supplying a gaseous combustion mixture suitable for rutile production through supply tube 31 together with carbon monoxide through pipe 28 and liquid titanium tetrachloride through pipe 29. The combustion mixture ignites spontaneously and its flow rate is adjusted so that it burns in a turbulent flame at least several inches long. The rates of flow of the carbon monoxide and liquid titanium tetrachloride are adjusted to minimize pigment build up and provide rapid cooling of the combustion products.

At equilibrium the reactor may be regarded for purposes of discussion as having four zones, although it is to be understood that the several zones run together without clear division between them. In the first zone located at the initial or uppermost part of tube 23, the gas is given a uniform full displacement turbulent flow resulting principally from its speed and the jet effect of the comparatively small orifice 31. This zone is usually short but is sufficiently long to prevent formation of titanium dioxide incrustations over the exit end of tube 31 and disc 30. In the second zone located just downstream from the first zone the gas is rapidly heated with nucleation as the principal effect. In the third zone which may occupy the remainder of tube 23 and which may extend into tube 24 the gas undergoes combustion in the form of a turbulent flame about a foot or more in length moving in uniform full displacement flow, so that at any point along this zone the cross-section velocity profile and temperature gradient of the stream are nearly flat. The fourth or cooling zone is located in pipe 24.

For rutile production the combustion gas mixture advantageously contains a small amount of rutile promotor such as aluminum chloride. Moreover, rutile formation is favored by high flame temperatures. Hence the combustion gas is advantageously well preheated and furthermore contains fuel gas to supply additional heat upon combustion and the reaction zone is well insulated not only around that portion of the tube in which the flame is contained but around an additional downstream portion so that the pigment may be kept longer at a rutile-forming temperature than would otherwise be the case. The purge gas admitted through pipe 28 may be hot to assist this effect. The size of the pigment particles may be controlled by varying the number of nuclei formed as described above.

The combustion should be sufficiently intense that on the one hand at least about 90% of the pigment is rutile (this being about the commercially acceptable minimum), and yet not so intense that the titanium dioxide is produced in the form of sintered aggregates. Suitable pigment is readily identified by X-ray diffraction and electron photomicrographic means, so that optimum operating conditions for the production of pigment of any desired quality are most conveniently established by trial.

The principal advantages associated with streamline or laminar combustion, as described in connection with Fig. 1, are the compact dimensions of the reactor, which may be quite short, the small amount of gas needed to keep the reactor walls free from pigment build-up, and the fact that anatase or rutile can be formed almost interchangeably therein.

Turbulent combustion of the gas as described in connection with Fig. 2 has its own particular advantages among which are these:

(1) The velocity of the gases may be greater than that possible under streamline flow, permitting more intensive combustion with a correspondingly greater titainium dioxide output per unit cross-section area of the reactor, the average velocity of gas in streamline flow through a cylindrical pipe being only about 50% of its axial velocity, whereas the average velocity of gas in turbulent flow is about 75% of its axial velocity.

(2) Nuclei are formed more uniformly within the gas and the gas is burned in a more uniform manner than is the case with streamline flow. As a result the pigment obtained exhibits a sharper particle size distribution curve, permitting it to contain a larger proportion of particles of optimum size. These improvements result from the more intensive mixing which takes place under conditions of turbulent flow.

(3) All other things being equal the temperature of a turbulent flame is higher than the temperature of a laminar flame, this being due to the greater intensity with which combustion takes place and to the decreased amount of heat which is lost by radiation. As a result less fuel gas is required to achieve any given temperature and if desired may be omitted entirely.

The remaining components are, if desired, fuel gas components, nucleating gases, inert gases, non-metallic chlorides which modify the pigmentary properties of the product such as silicon tetrachloride, and even tinting or color forming chlorides such as vanadium and nickel chlorides. The combustion gas mixture may consist exclusively of titanium tetrachloride and oxygen and in such event either gas may be present in excess but it is advantageous to use a slight excess (10–20 mol percent of oxygen to insure reaction of the more costly titanium tetrachloride. The invention thus includes respective molar ratios between 0.9 and 1.2.

The gas may advantageously contain a combustible gas or gaseous mixture as fuel gas component to supply heat in excess of that contributed by combustion of the titanium tetrachloride with the oxygen. The weight of the fuel gas component may vary from a few percent or less up to about 50% of the weight of the combustion gas mixture, but in commercial operation generally need not exceed 15–25% of the weight thereof.

As fuel component there may be employed hydrogen or a volatile hydrocarbon, an ester, a ketone, or an alcohol, together with oxygen for combustion. Representative gases include methane, ethane, propane, butane, benzene, toluene, ethyl acetate, acetone, methanol, ethanol, and diethyl ether together with the requisite amount of oxygen for combustion thereof. These gases, however, are not preferred. In the first place they yield water which combines with chlorine and transforms it into the much less valuable hydrochloric acid. In the second place the water formed is a nucleating agent. This has the disadvantage of making the supply of nuclei a function of the particular fuel gas selected, i.e., a dependent variable.

We have found, however, that carbon monoxide-oxygen as the fuel gas component (in the proportions contemplated by the present invention) possesses the following important advantages not possessed by any other gas so far as is known.

(1) The fuel component does not supply nuclei on its own account and does not inhibit autonucleation of the titanium tetrachloride by the oxygen present. The fuel component thus causes no material change in amount or type of nucleation at any given temperature.

(2) Substantial variations in the proportion of fuel component cause only minor variations in the number of nuclei formed. It is thus possible to make large changes in the temperature of the combustion flame while maintaining within the pigmentary range the particle size of the titanium dioxide produced. The fuel gas thus exerts only thermal and dilution effects.

(3) The gas as a whole is safe to use and presents only a negligible danger of explosion. The most combustible mixtures of the present invention contain about 60% by weight of fuel gas component based on the weight of the pigment-producing component. Tests have shown that even these mixtures can be preheated as high as about 400° C. in aluminum tubing when supplied under conditions of laminar flow to the reactor at as slow a speed as 20 cm./sec. without backward propagation of the flame up the feed tube or flashing back.

Decreasing the proportion of fuel component in the mixture decreases the rate flame propagation therein so that preferred mixtures (i.e. mixtures containing 15% to 25% of fuel gas components on the weight of pigment producing components) can be safely piped at temperatures up to their nucleation point of about 700° C., and undergo combustion in a portion of the reactor well downstream from the entrance orifice.

(4) The fuel component is largely oxidized to carbon dioxide. This gas does no harm when present and can be easily removed.

Despite our preference for carbon monoxide-oxygen as fuel gas, the employment of other combustible gaseous mixtures alone or in conjunction therewith is within the scope of the present invention.

The principal direct effect of the fuel component is to increase the temperature of the flame. This has two principal consequences. The first effect is to change the average diameter of the pigment particles formed, and when the combustion gas is admitted well below nucleation temperature, the change is usually in the direction of finer particle size with shift in the tint tone of the pigment towards blue. The second principal consequence is to shift the configuration of the pigment which is formed from anatase towards rutile.

Even as little as 0.1 mol of carbon monoxide and 0.05 mol of oxygen per mol of titanium tetrachloride generally causes a perceptible shift in this beneficial direction, and evidently in certain instances smaller amounts may be sufficient. Considerably more fuel component may often be used to advantage, but no more than about 3 mols of carbon monoxide and 1.5 mols of oxygen has so far been needed. Large amounts of fuel component produce at best only a minor improvement in tint tone while disproportionately increasing costs.

The combustion mixture may contain an inert gas as diluent such as nitrogen, carbon dioxide, or an excess of any one of the reagents in any desired amount so long as the mixture as a whole does not become incombustible. The effect of the diluent is primarily to absorb heat during the nucleation and combustion reactions. Fewer nuclei thus tend to form with consequent coarsening of the pigment.

The combustion gas may contain the normal small but effective amounts of the other volatile halides heretofore employed in the manufacture of pigment (up to a total of 10% of the weight of TiCl$_4$) such as aluminum chloride, zinc chloride, silicon tetrachloride and antimony trichloride. No doubt the presence of these supplementary halides requires equivalent oxygen so as to ensure combustion. These halides (together with the titanium tetrachloride and associated O$_2$) are the pigment-producing components of the gaseous mixtures of the present invention and amount to at least 50% of the weight of the gas.

The combustion gases of the present invention thus contain at least about 50% of pigment producing components and are capable of burning in full displacement flow as a self-sustaining flame with evolution of heat and light.

It will be understood that carbon monoxide (as commercially supplied) often contains up to 1% or slightly more of hydrogen, hydrocarbon gases or water vapor. Such gas is suitable for use in the process of the present invention as the results obtained therewith are practically indistinguishable from those obtained from pure CO. Although it has not been tried, no reason is seen why the combustion gas may not also contain ozone (which may perform the double function of acting as a nucleating agent and as an equivalent for oxygen in the main reaction), one or more of the nitrogen oxides, and one or more of the subchlorides of titanium, the latter acting principally as nucleating agents. Combustion mixtures containing small amounts of such materials are therefore included within the scope of the present invention.

Combustion mixtures suitable for use in the present invention may be formed by known methods. A preferred mixture may be conveniently formed by uniformly volatilizing pure liquid titanium tetrachloride such as is produced by U.S. Patent No. 2,592,021, metering the desired amount of heated carbon monoxide or other fuel gas into the stream, and then metering heated oxygen into the mixture to give a homogeneous stream having a temperature between about 250°–400° C., after which the stream may be further heated and one or more of the supplementary materials referred to above added.

The amount of oxygen in the combustion gas should generally be roughly stoichiometrically equivalent to the combustible material therein. In some trials better pigment has resulted with a deficiency of oxygen so that the combustion product contains a small amount of carbon monoxide. In the majority of trials however best results have been obtained with a slight (10%–20%) excess of oxygen over the stoichiometric. Aluminum apparatus and tubing may be used throughout for the preparation of the combustion gas and its delivery to the reactor.

The gas may be set in turbulent flow by increasing its velocity by decreasing the diameter of the reactor, by admitting the gas into the reactor as a jet, by providing transverse jets or baffles within the reactor, or by any other equally effective means. The particular means referred to are well known to those skilled in the art of flame propagation and form no part of the present invention.

The invention is further illustrated by the examples which follow. The examples are specific embodiments of the invention and are not to be construed as limitations thereon.

*Example 1*

The manufacture of anatase pigment from a preformed gaseous mixture consisting solely of titanium tetrachloride and oxygen is illustrated by the following.

The apparatus employed was a vertical cylindrical reactor constructed from standard silica shapes generally according to Fig. 1, the principal difference being that jackets 7 and 8 were omitted. Tubes 1 and 3 of the figure were replaced by a single tube 3.25" in inside diameter and 45" long, and contained a gas streamline guide 18" long consisting of three concentric aluminum tubes. This tube discharged into a silica tube 6" in diameter and 24" long, corresponding to tube 5 of the drawing. The wall thickness of both tubes was ¼". The upper tube was encased in 6" and the lower tube in 12" of insulating brick.

The apparatus was preheated to 1050° C. by passing nitrogen at 300° C. into the upper tube through orifice 12 and by burning separately admitted carbon monoxide and oxygen in the upper portion of the 6" tube. Heating was discontinued. A titanium tetrachloride-oxygen mixture in 1:1.1 molar ratio preheated to 300° C. was admitted to the upper tube through the main feed orifice. The mixture ignited spontaneously in the 6" tube. With adjustment of the rate of flow the flame was made to burn steadily in laminar form at the junction of the upper and lower tubes, the upper tube thus acting as flame holder. The flow rate of the gas (calculated at 300° C.) during this stable combustion was 6.0 cm./sec., and calculations showed that the dwell time of the pigment in the flame was roughly 0.06 sec.

A sample of the discharge from the tube was collected and analyzed for titanium tetrachloride. None was found, indicating substantially complete oxidation of the titanium tetrachloride to titanium dioxide.

The apparatus was operated for about an hour and then examined. The interior surface of the reactor upstream from the combustion zone carried only a very light coating of non-adherent titanium dioxide dust showing that the temperature of the gas throughout the initial part of the tube was below its combustion point and that the gas did not undergo combustion to more than negligible extent until it reached the flame front.

An electron photomicrograph of the pigment recovered showed that the particles were characterized by uniformity in size, the diameter of practically all particles being within 50% of the average diameter of $0.4\mu$. Examination by X-ray diffraction showed that the pigment was anatase containing 11% rutile.

This test showed that a preformed mixture of titanium tetrachloride and oxygen without excessive preheating can be burned in full displacement laminar flow in a self-sustaining flame to yield satisfactory titanium dioxide pigment and that when so burned sufficient autonucleation takes place uniformly within the gaseous mixture to cause formation of pigment of very uniform particle size.

*Example 2*

The production of rutile by the foregoing method is illustrated as follows.

Example 1 was repeated except that aluminum chloride was added to the gas as rutile promoters in amount equal to 2.8% of the weight of the titanium tetrachloride. The pigment recovered was >99% rutile by X-ray diffraction.

The tint tone and tinting strength of the pigment was determined by a standardized laboratory procedure wherein the pigment is formed into a paste with castor oil, and increments of carbon black and added to make the sample match a standard paste made from top quality titanium dioxide and a specified amount of carbon black. The tinting strength is reported on a scale wherein 1600 is excellent and 1500 satisfactory for rutile, and 1200 is excellent and 1100 satisfactory for anatase. Tint tone is reported in points of discernible difference from the standard in the direction of blue (Bl) or brown (Br), pigment within the range of $Bl_2$–$Br_3$ being suitable for use in the manufacture of premium grade white paints and lacquers.

The pigment had the very satisfactory tint tone of $Br_1$ and tinting strength of 1540. This shows that the foregoing method produces satisfactory quality anatase and rutile almost interchangeably.

*Example 3*

The following illustrates the manufacture of high-quality anatase titanium dioxide pigment from a preformed titanium tetrachloride-oxygen mixture containing a fuel component burning in streamline flow in apparatus similar to that of Fig. 1.

The apparatus employed corresponded to that of Example 1 except for the following changes. The last 6" of the 3.25 (upper) silica tube and all of the 6" (lower) tube were replaced by porous Alundum tubing (RA-98 manufactured by Norton Refractory Co.) having the same respective diameters and a wall thickness of about ½". The porous sections were placed inside a 8" diameter steel jacket, the top and bottom of which was closed by a non-porous Alundum disc. The entire apparatus was packed in 6" of insulating brick. Nitrogen gas at room temperature and 0.5" Hg pressure was passed into the jacket where it percolated through the porous tubing at a rate equivalent to about 0.6 ft.$^3$ of gas (N.T.P.) per ft.$^2$ of wall surface per minute. The porous tubing was preheated to about 1000° C. by burning carbon monoxide and oxygen therein at about the point where the 3.25" and 6" tubes joined.

Heating was then discontinued and a stream of titanium tetrachloride, carbon monoxide and dioxide in 1:1.75:2.2 molar ratio preheated to 400° C. was passed through the combustion gas feed orifice. The gas ignited spontaneously in the 6" tube, and the average rate of gas supply was such that 25 cc. of titanium tetrachloride was volatilized per minute in the preparation of the gas.

With adjustment of the gas flow a laminar flame front formed at the exit end of the 3.25" Alundum tube and burned steadily there, producing titanium dioxide and chlorine.

The run was continued for 70 minutes, after which the apparatus was cooled and inspected. The entire interior of the apparatus was free from titanium dioxide incrustations, and contained only a light titanium dioxide dust which was not adherent. There was no evidence of titanium dioxide build-up or incipent plugging anywhere, from which it appeared that the apparatus could have been run practically indefinitely.

Analysis of the pigment by X-ray diffraction showed that 93% was anatase, the remainder being rutile. The high content of anatase was due to the rapidity with which the pigment particles fell in temperature on emerging from the flame front. This resulted from absorption of heat by the comparatively cool walls of the 6" tube. Evaluation showed that the pigment had the excellent tinting strength of 1210 and the tint tone of $Bl_1$.

An electron photomicrograph showed that the average diameter of the particles was $0.2\mu$, and that practically all of the particles were between $0.1\mu$ and $0.3\mu$ in diameter. This uniformity was due to the fact that the titanium oxide nuclei were uniformly distributed through the gas as it arrived at the flame front, and showed that very satisfactory nucleation had taken place.

The pigment was heated at 500° C. for 30 minutes to drive off adsorbed chlorine and jet milled to decrease oil adsorption. The resulting pigment was formulated into an oil-alkyl resin vehicle by standard laboratory procedure. The resulting paint was substantially as satisfactory as paint prepared from corresponding sulfate process pigment.

The procedure was repeated except that 1% of silicon tetrachloride was added to the combustion gas as rutile suppressor. The pigment was >99% anatase and of substantially the same quality.

*Example 4*

The procedure of Example 3 was repeated in the same apparatus except that the ratio of the fuel component in the gas feed was varied, so as to illustrate the effect of this change on the particle size of the pigment formed and the combustion gas contained 2.6% of aluminum chloride. Moreover, in each case a 20% excess of oxygen was used over that stoichiometrically necessary, and the combustion temperature was 850° C. (by thermocouple inserted in tube 6" downstream from the flame front).

In the case of runs 1, 4 and 8 the gas burned at the junction of the larger and the smaller tubes, whereas in the case of runs 2, 3, 5, 6 and 7 the gas burned within the 6" tube.

| Run No. | Flow Rate, cm./sec.[1] | Fuel Gas [2] | | Pigment Tint Tone [3] |
|---|---|---|---|---|
| | | Mols CO | Mols Oxygen | |
| 1 | 7 | 0.5 | 0.25 | $Br_4$. |
| 2 | 12 | 0.5 | 0.25 | $Br_3$. |
| 3 | 17 | 0.5 | 0.25 | $Br_1$. |
| 4 | 14 | 1.5 | 0.75 | $Bl_1$. |
| 5 | 20 | 1.5 | 0.75 | Standard. |
| 6 | 30 | 1.5 | 0.75 | $Br_1$. |
| 7 | 33 | 1.5 | 0.75 | $Br_2$. |
| 8 | 20 | 3.0 | 1.5 | $Bl_3$. |

[1] Inside the 3.25" tube calculated at 350° C.
[2] Mol ratio of $TiCl_4$ to total $O_2$ was 1:1.2.
[3] All pigment was suitable for commercial use. For explanation of values see Example 2.

The data show that increasing the amount of the fuel component in the mixture shifts the tint tone of the pigment towards blue, indicative of a decrease in the diameter of the pigment particles.

Run No. 8 was made with one of the most combustible mixtures of the present invention. The gas was supplied without flash back at the quite elevated temperature of 400° C. and the slow speed of 20 cm./sec., showing the great stability of the gas composition.

*Example 5*

The following illustrates the manufacture of high quality rutile pigment from a combustion gas in rapid turbulent flow containing titanium tetrachloride and as principal pigment forming component and carbon monoxide plus additional oxygen as fuel component.

The apparatus consisted essentially of a non-porous Alundum tube 26″ long and 1.5″ in inside diameter. The gas feed orifice was 0.27″ in diameter so as to facilitate development of a turbulent flow by jet effect. The tube was encased in two feet of insulating brick starting 2″ from the inlet end. Thermocouples were placed every 3″ along the tube.

The insulated part of the tube was heated to about 1050° C. by burning a $CO-N_2-O_2$ mixture (molar ratio 1:2:1.5). Heating was discontinued and a $$TiCl_4-CO-O_2-N_2$$

mixture (molar ratio 1:1.23:1.85:1.23) containing 2.6% of aluminum chloride on the weight of titanium tetrachloride preheated to 250° C. was then passed into the tube through the entrance orifice at a velocity of about 90 cm./sec. The gas ignited spontaneously. The rate of gas flow was varied until burning (as determined by a sighting probe inserted through the discharge end) started at a point about 9″ from the orifice. The burning continued over 5″ of the tube, showing that the gas was in turbulent flow. The pigment produced was of excellent quality, having a tinting strength of 1800 and tint tone of $Bl_2$ (as determined according to Example 2). It was >99% rutile as determined by X-ray diffraction, and very uniform in particle size.

The tests show that even in the case of rutile manufacture the process of the present invention permits preheating of the combustion gas to be substantially completely eliminated, since the heat required for nucleation was very largely supplied by reverberation from the flame front. The test further illustrates the very simple type of reactor which may be employed while obtaining pigment of outstandingly excellent tinting strength and particle size.

*Example 6*

The procedure of Example 5 was repeated except that the gas ratio was changed to 1:0.62:1.53:1.23, the amount of the fuel component thus being decreased by about 50%. The gas thus contained 64.5% by weight of titanium tetrachloride, and was 27.5% by weight of titanium dioxide equivalent. The pigment produced analyzed >99% rutile. It had a tinting strength of 1700 and a tint tone of $Br_3$ (as determined according to Example 2) both of which were very satisfactory.

Later tests showed that omission of the nitrogen caused negligible change in the quality of the pigment.

*Example 7*

The procedure of Example 5 was repeated, except that 0.5 mol percent of the titanium tetrachloride in the combustion gas was replaced by silicon tetrachloride and the gas contained 2.6% by weight of aluminum chloride. Oxidation of all three metal halides was complete, and >99% of the pigment was rutile of excellent quality.

*Example 8*

The procedure of Example 7 was repeated except that about 1% of zirconium chloride was sublimed into the combustion gas based on the weight of the titanium tetrachloride. A similar pigment was obtained which contained zirconium oxide.

*Example 9*

The procedure of Example 3 was repeated except that the fuel component was increased so that the $TiCl_4:CO:O_2$ ratio was about 1.0:2.65:3.0. The pigment was excellent anatase of 4% rutile content. The particles were spherical and had a tint tone of $Bl_3$, as determined by the method of Example 2.

*Example 10*

The procedure of Example 3 was repeated, except that 2.5% of aluminum chloride (based on the weight of the titanium tetrachloride) was added to the combustion gas, and carbon dioxide at 800° C. (formed by burning of carbon monoxide and oxygen) was supplied to the jacket in place of the nitrogen. Rutile pigment of excellent quality was obtained, and despite the higher jacket gas temperature no incrustations of titanium dioxide formed inside the apparatus after 60 minutes of operation.

*Example 11*

The following runs were performed to illustrate the preparation of titanium dioxide from combustion gases of different fuel gas and inert gas contents supplied at different speeds through gas feed orifices of different diameters.

The reactor was that employed in Example 5, except that the gas feed orifice had the diameters shown in the table.

In each case the flames were turbulent and were about 5″ long, as indicated by a plot of thermocouple temperatures.

The maximum temperature shown by any of the thermocouples is given in the table and also the location at which the maximum temperature occurred. This indicates the approximate center of the flame.

The particle size of the pigments obtained was determined directly from electron photomicrographs.

| Run No. | Combustion Gas, Mols | | | | Temp., °C.[1] | Diam. Gas Orif. (In.) | Velocity[2] | | Max. Temp., °C.[3] | Flame Center[4] inches | Pigment[5] | | |
|---|---|---|---|---|---|---|---|---|---|---|---|---|---|
| | $TiCl_4$ | CO | $O_2$ | $N_2$ | | | Of Feed[6] | In Reactor | | | Av. Part. Size,[7] μ | Tinting Strength | Tint Tone[8] |
| 1 | 1 | 1.23 | 1.85 | 1.23 | 250 | 0.269 | 93 | 3 | 1,040 | 9 | 0.22 | 1,800 | $Bl_2$ |
| 2 | 1 | 0.62 | 1.53 | 1.23 | 250 | 0.269 | 77 | 2.5 | 1,080 | 7 | 0.30 | 1,700 | $Br_3$ |
| 3 | 1 | 1.23 | 1.85 | 1.23 | 250 | 0.188 | 185 | 3 | 1,070 | 10 | 0.25 | 1,810 | $Bl_2$ |
| 4 | 1 | 0.62 | 1.53 | Nil | 250 | 0.188 | 220 | 3.6 | 1,150 | 8 | 0.33 | 1,810 | $Br_2$ |
| 5 | 1 | 0.31 | 1.46 | Nil | 250 | 0.188 | 186 | 3.0 | 1,190 | 6 | 0.40 | 1,720 | $Br_3$ |

[1] On admission to reactor.
[2] Ft./sec. calculated at 250° C.
[3] By thermocouple next to the combustion zone. Actual combustion temperatures were somewhat higher.
[4] From feed end of reactor.
[5] In each case the pigment analyzed >99% rutile by X-ray diffraction.
[6] Through gas feed orifice.
[7] From electron micrograph.
[8] All samples were very satisfactory. Values were obtained by method of Example 2.

The data of this table indicate that increasing the turbulence of the combustion gas increased the intensity of burning and that decreasing the amount of fuel gas tends to increase the size of the pigment particles and decrease their tinting strength (runs 4 and 5), and that removing inert gas from the combustion mixture has only a slight effect upon the product (runs 2 and 4).

The appearance of the pigment in the electron photomicrographs was remarkable. The particles were well formed, compact, and approximately spherical in form. Moreover, they were very uniform in size. This testifies to the uniform development of a large number of nuclei in the gaseous stream and to the high flame temperatures which prevailed.

This is a continuation-in-part of our copending application Serial No. 519,982, filed on July 5, 1955, now abandoned.

We claim:

1. A method of manufacturing titanium dioxide pigment which comprises passing in full displacement flow a single preformed homogeneous gaseous combustion mixture containing titanium tetrachloride and oxygen as principal pigment-producing components into a substantially self-sustaining flame substantially formed by combustion of said combustion mixture itself, and burning said mixture in full displacement flow in said flame thereby uniformly oxidizing at least a substantial part of said titanium tetrachloride to titanium dioxide in said flame, said combustion mixture having an average speed between about ⅔ and ⅘ of its axial speed.

2. A method of manufacturing titanium dioxide pigment which comprises passing in full displacement flow a single preformed homogeneous gaseous combustion mixture containing titanium tetrachloride and oxygen as principal pigment-producing components and at least one fuel component into a substantially self-sustaining flame substantially formed by combustion of said combustion mixture itself, and burning said mixture in full displacement flow in said flame thereby uniformly oxidizing at least a substantial part of said titanium tetrachloride to titanium dioxide in said flame, said combustion mixture having an average speed between about ⅔ and ⅘ of its axial speed.

3. A process of manufacturing titanum dioxide pigment which comprises passing in full displacement flow a single preformed homogeneous gaseous combustion mixture containing titanium tetrachloride and oxygen as principal pigment-producing components into a substantially self-sustaining flame substantially formed by combustion of said combustion mixture itself and burning said mixture in full displacement flow in said flame in the presence of a minor but effective amount of sub-pigmentary titanium oxide particles wherein said particles act as crystal growth directing nuclei thereby uniformly oxidizing at least a substantial part of said titanium tetrachloride to titanium dioxide in said zone, said combuston mixture having an average speed between about ⅔ and ⅘ of its axial speed.

4. A process of manufacturing titanium dioxide pigment which comprises passing in full displacement flow a single preformed homogeneous gaseous combustion mixture containing titanium tetrachloride and oxygen as principal pigment-producing components into a substantially self-sustaining flame substantially formed by combustion of said combustion mixture itself and burning said mixture in full displacement flow in said flame in the presence of a minor but effective amount of autogenously formed sub-pigmentary titanium oxide particles wherein said particles act as crystal growth directing nuclei thereby uniformly oxidizing at least a substantial part of said titanium tetrachloride to titanium dioxide in said flame, said combustion mixture having an average speed between about ⅔ and ⅘ of its axial speed.

5. A method of manufacturing titanium dioxide pigment which comprises forming a single homogeneous gaseous combustion mixture containing titanium tetrachloride and oxygen as principal pigment-producing components and carbon monoxide and oxygen as principal fuel component, passing said mixture into a substantially self-sustaining flame substantially formed by combustion of said combustion mixture itself, and burning said mixture in full displacement flow in said flame in the presence of a minor but effective amount of autogenously formed sub-pigmentary titanium oxide particles wherein said particles act as crystal growth directing nuclei thereby uniformly oxidizing at least a substantial part of said titanium tetrachloride to titanium dioxide in said flame, said combustion mixture having an average speed between about ¾ and ⅝ of its axial speed.

6. A method of manufacturing titanium dioxide pigment which comprises forming a single homogeneous gaseous combustion mixture of titanium tetrachloride and oxygen in respecitve molar ratio between about 1:0.9 and 1:1.2, delivering the mixture at a temperature below about 650° C. through an aluminum conduit to a combustion chamber, flowing the mixture at a temperature below the combustion point thereof through an initial portion of said chamber in full displacement turbulent flow into a substantially self-sustaining flame substantially formed by combustion of said combustion mixture itself, and burning the mixture in full displacement flow in said flame thereby uniformly oxidizing at least a substantial part of said titanium tetrachloride to titanium dioxide in said flame, said combustion mixture having an average speed between about ¾ and ⅝ of its axial speed.

7. A method of manufacturing titanium dioxide pigment which comprises forming a single homogeneous gaseous combustion mixture containing titanium tetrachloride and oxygen as principal pigment-producing components and containing carbon monoxide and additional oxygen as principal fuel component, supplying said mixture at a temperature not in excess of about 650° C. to the entrance end of a cylindrical reactor of porous refractory, passing said mixture in full displacement flow down said reactor and into a substantially self-sustaining flame therein substantially formed by combustion of said combustion mixture itself and burning said mixture in full displacement flow in said flame, thereby uniformly oxidizing at least a substantial part of said titanium tetrachloride to titanium dioxide, discharging the products of said flame from said reactor, and passing inert gas transversely through at least a portion of the walls of said reactor at a rate sufficient to prevent adhesion of titanium dioxide particles thereto, the average speed of the combustion mixture through the reactor being between about ¾ and ⅝ of the speed of the mixture along the axis of the reactor.

8. A method of manufacturing titanium dioxide pigment which comprises forming a single homogeneous gaseous combustion mixture containing titanium tetrachloride and oxygen as principal pigment-producing components and containing carbon monoxide and additional oxygen as principal fuel component, supplying said mixture at a temperature below about 650° C. through an aluminum tube to a refractory combustion tube, and passing said mixture in full displacement flow into a substantially stationary self-sustaining flame substantially formed by combustion of said combustion mixture itself within said refractory tube and burning said mixture in full displacement flow in said flame thereby oxidizing said titanium tetrachloride to titanium dioxide, the average speed of the combustion mixture through the combustion tube being between about ¾ and ⅝ of the speed of the mixture along the axis of the tube.

9. A method of manufacturing anatase titanium dioxide pigment which comprises forming a single homogeneous gaseous combustion mixture containing titanium tetrachloride and oxygen as principal pigment-producing components and carbon monoxide and additional oxygen as principal fuel component, passing said mixture in full displacement streamline flow into a substantially self-sustaining laminar flame substantially formed by combustion of said combustion mixture itself, and burning said mixture in full displacement streamline flow in said flame thereby oxidizing at least a substantial proportion of said titanium tetrachloride to anatase titanium dioxide in a laminar flame in the presence of a minor but effective amount of autogenously formed subpigmentary titanium oxide particles wherein said particles act as crystal growth directing nuclei for said anatase titanium dioxide, said combustion mixture having an average speed between about ⅔ and ⅘ of its axial speed.

10. A method of manufacturing anatase titanium dioxide pigment which includes the steps of forming a single homogeneous gaseous combustion mixture containing titanium tetrachloride and oxygen as principal pigment-producing components, burning said mixture while in full displacement streamline flow in the form of a substantially stationary self-sustaining laminar flame substantially formed by combustion of said combustion mixture itself, thereby rapidly and uniformly oxidizing at least a substantial part of said titanium tetrachloride to anatase titanium dioxide, and rapidly cooling said anatase to a temperature below that at which conversion of anatase to rutile takes place, said combustion mixture having an average speed between about ¾ and ⅚ of its axial speed.

11. A method of manufacturing anatase titanium dioxide pigment which comprises forming a single homogeneous gaseous combustion mixture containing titanium tetrachloride and oxygen as principal pigment-producing components and carbon monoxide and additional oxygen as principal fuel components, passing said mixture in full displacement streamline flow into a substantially stationary self-sustaining laminar flame substantially formed by combustion of said combustion mixture itself, thereby first forming titanium oxide crystal growth nuclei uniformly in said mixture and then oxidizing said titanium tetrachloride on said nuclei in said flame to anatase titanium dioxide, and rapidly cooling said anatase to a temperature below that at which conversion of anatase to rutile takes place, said combustion mixture having an average speed between about ¾ and ⅚ of its axial speed.

12. A method of manufacturing anatase titanium dioxide pigment which comprises forming a single homogeneous gaseous combustion mixture containing titanium tetrachloride and oxygen as principal pigment-producing components and containing carbon monoxide and oxygen as principal fuel components, passing said mixture in full displacement streamline flow into a combustion tube discharging into a cooling tube of greater diameter, said cooling tube having porous walls, oxidizing at least a substantial part of said titanium tetrachloride to titanium dioxide in a self-sustaining laminar flame at the discharge end of said combustion tube, said flame being substantially formed by combustion of said combustion mixture itself, and passing gas having a temperature below about 600° C. transversely through the porous walls of said cooling tube thereby preventing adhesion of said pigment thereto, the average speed of the combustion mixture through the combustion tube being between about ¾ and ⅚ of the speed of the mixture along the axis of the tube.

13. A method of manufacturing rutile titanium dioxide pigment which comprises passing in full displacement flow a single homogeneous gaseous combustion mixture containing titanium tetrachloride and oxygen as principal pigment-producing components into a substantially self-sustaining flame substantially formed by combustion of said combustion mixture itself, and burning said mixture in full displacement flow in said flame thereby uniformly oxidizing at least a substantial part of said titanium tetrachloride to anatase titanium dioxide in said flame and maintaining said anatase at a rutile-forming temperature until conversion of said anatase to rutile is substantially complete, said combustion mixture having an average speed between about ⅔ and ⅘ of its axial speed.

14. A method of manufacturing rutile titanium dioxide pigment which includes the steps of forming a single homogeneous gaseous combustion mixture containing titanium tetrachloride and oxygen as principal pigment-producing components, carbon monoxide and additional oxygen as fuel components, and aluminum chloride as agent promoting formation of rutile, passing said mixture in full displacement flow into a substantially self-sustaining flame substantially formed by combustion of the single combustion mixture itself, and burning said mixture in full displacement turbulent flow in said flame in the presence of a minor but effective amount of autogeneously formed subpigmentary titanium oxide particles wherein said particles act as crystal growth directing nuclei, said combustion mixture having an average speed between about ⅔ and ⅘ of its axial speed.

15. A method according to claim 6 wherein the combustion gas contains a small but effective amount of aluminum chloride as rutile promotor, and the combustion mixture is burned to form rutile.

16. A method of manufacturing rutile titanium dioxide pigment which comprises forming a single homogeneous gaseous combustion mixture containing titanium tetrachloride and oxygen as principal pigment-producing components, carbon monoxide and additional oxygen as principal fuel components, and aluminum chloride as agent promoting formation of rutile, supplying said mixture at a temperature not in excess of 650° C. to the entrance end of a cylindrical reactor of porous refractory, passing said mixture in full displacement turbulent flow down said reactor into a substantially self-sustaining flame therein substantially formed by combustion of the single combustion mixture itself, burning said mixture in full displacement flow in said flame thereby forming a flame product containing titanium dioxide particles of pigmentary dimensions, discharging said flame product from the exit end of said reactor, and passing a gas transversely through the walls of at least a portion of said reactor thereby preventing adhesion of said titanium dioxide particles to said walls, the average speed of the combustion mixture down the reactor being between about ¾ and ⅚ of the speed of the mixture along the axis of the reactor.

References Cited in the file of this patent

UNITED STATES PATENTS

| 2,635,946 | Weber et al. | Apr. 21, 1953 |
| 2,270,275 | Olson et al. | Feb. 23, 1954 |
| 2,750,260 | Nelson et al. | June 12, 1956 |
| 2,779,662 | Frey | Jan. 29, 1957 |

FOREIGN PATENTS

| 1,074,265 | France | Oct. 4, 1954 |
| 661,685 | Great Britain | Nov. 28, 1951 |
| 686,568 | Great Britain | Jan. 28, 1953 |
| 686,570 | Great Britain | Jan. 28, 1953 |
| 689,123 | Great Britain | Mar. 18, 1953 |
| 726,250 | Great Britain | Mar. 16, 1955 |

UNITED STATES PATENT OFFICE

CERTIFICATION OF CORRECTION

Patent No. 2,957,753

October 25, 1960

Earl W. Nelson et al.

It is hereby certified that error appears in the above numbered patent requiring correction and that the said Letters Patent should read as corrected below.

Column 3, line 39, for "provided" read -- providing --; column 4, line 11, for "desirable" read -- desirably --; column 12, line 74, footnote to the table, for "Iuse" read -- use --; column 15, line 16, for "519,982" read -- 519,892 --; column 16, line 18, for "respecitve" read -- respective --.

Signed and sealed this 9th day of May 1961.

(SEAL)
Attest:
ERNEST W. SWIDER
Attesting Officer

DAVID L. LADD
Commissioner of Patents